US007337196B2

(12) United States Patent
Albaugh et al.

(10) Patent No.: US 7,337,196 B2
(45) Date of Patent: Feb. 26, 2008

(54) RECORD RELATIONSHIP PROCESSING

(75) Inventors: Virgil A. Albaugh, Austin, TX (US); Messaoud Benantar, Austin, TX (US); Philip Yen-tang Chang, Austin, TX (US); Hari Haranath Madduri, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 10/226,965

(22) Filed: Aug. 22, 2002

(65) Prior Publication Data

US 2004/0039753 A1  Feb. 26, 2004

(51) Int. Cl.
*G06F 12/00* (2006.01)
*G06F 17/30* (2006.01)

(52) U.S. Cl. .......................................... 707/203; 707/7
(58) Field of Classification Search ................ 707/203, 707/202, 201, 200, 8, 9, 5, 7; 709/220
See application file for complete search history.

(56) References Cited

U.S. PATENT DOCUMENTS

| | | | |
|---|---|---|---|
| 5,893,099 A | 4/1999 | Schreiber et al. | ............. 707/10 |
| 6,044,395 A | 3/2000 | Costales et al. | ............. 709/206 |
| 6,163,802 A | 12/2000 | Lin et al. | ..................... 709/217 |
| 6,766,334 B1 * | 7/2004 | Kaler et al. | .................. 707/203 |
| 6,836,792 B1 * | 12/2004 | Chen | ........................... 709/220 |

OTHER PUBLICATIONS

Syd Weinstein, "The Elm Users Guide" Oct. 1, 1992,The USENET Community Trust, Version 2.4, pp. 0-12.*
Hambridge, "RFC 1855—Netiquette Guidelines", Oct. 1995, http://tools.ietf.org/html/rfc1855, pp. 1-22.*
"Using Electronic Mail in UNIX: UCB Mail", Jul. 2002, Academic and Research Computering, RPI, Troy, NY 12180, all.*

* cited by examiner

*Primary Examiner*—Sam Rimell
*Assistant Examiner*—Jacob F. Betit
(74) *Attorney, Agent, or Firm*—David A. Mims, Jr.; Robert V. Wilder

(57) ABSTRACT

A method and implementing computer system are provided in which a unique primary key is generated to identify an original message which is received for processing. The record for the original message is stored at the primary key. As the message is propagated to the services that are to be performed on the original message, the primary key is also passed to the service. Derivative messages which are produced as a result of the services applied to the original message are identified with the primary key code along with additional derivative key codes related to services applied to the original message. The resulting derivative message storing and tracking process provides a means by which derivative messages are readily identified and associated with an original message as well as the services performed upon the original message in generating the derivative message.

7 Claims, 5 Drawing Sheets

| MsgID | RefMsgID | Service | MsgData |
|---|---|---|---|
| 123 | Null | | A |
| 124 | | | |
| 125 | | | |
| 126 | 123 | Add B | AB |
| 127 | | | |
| 128 | | | |
| 129 | | | |
| 130 | | | |
| 131 | 126 | Add Z | ABZ |
| 132 | | | |
| 133 | | | |
| 134 | | | |
| 135 | | | |
| 136 | 131 | Add B | ABZB |
| 137 | | | |
| 138 | 136 | Lower | abzb |
| 139 | | | |

*FIG. 5*

RECORD RELATIONSHIP PROCESSING

FIELD OF THE INVENTION

The present invention relates generally to information processing systems and more particularly to a methodology and implementation for designating related records.

BACKGROUND OF THE INVENTION

In networked computer systems, electronic messages are regularly generated and sent among various computers connected within the network. As the messages are transmitted from one node or computer station to another, there is a need to keep track of various parameters relative to the messages being transmitted so that such messages may be tracked to determine the paths taken, the nodes involved in transmission of the message, times of transmission, etc. In one particular application, a service node is enabled to provide various services to electronic messages received from clients and to generate other messages in accordance with the services performed. For example, a client may send a single parts ordering message, which may in fact be a package of individual messages, to a service node and the service node or server site will generate a plurality of messages to different suppliers from the single communication from the client. Other processing services may also be provided (such as inventory updates, order processing steps, return credit calculations, translations to various formats, etc.) before the order is transmitted from the service node to the suppliers. In all of these situations there is a need to track the original message from the client through the various service stages of the service node to the supplier or other ultimate recipient of the communication from the service node.

The tracking function is performed at the service provider server or service node, as well as intermediate nodes along the way, by maintaining one or a series of related databases in which messages received from clients are logged. As services are performed relative to the message, the identification of those services is also input to the database such that at any given time, a client message can be accessed and tracked through the database to determine what services have been performed pursuant to the client message and what the current status of the client request is. Unfortunately, however, in the past whenever a new message is generated in response to a performed service for example, the new message takes on a new identity. Accordingly, when many services are performed in response to an original message, it is difficult to track any given resulting message back to the communication from which the resulting messages were derived.

Thus, there is a need for an improved processing system in which generated or synthesized messages are identified and tracked in a manner to enable easy identification and access to the derivation of subsequently produced messages.

SUMMARY OF THE INVENTION

A method and implementing computer system are provided in which a unique primary key is generated to identify an original message which is received for processing. The record for the original message is stored at the primary key. As the message is propagated to the services that are to be performed on the original message, the primary key is also passed to the service. Derivative messages which are produced as a result of the services applied to the original message are identified with the primary key code along with additional derivative key codes related to services applied to the original message. The resulting hierarchical derivative message storing and tracking process provides a means by which derivative messages are readily identified and associated with an original message as well as the services performed upon the original message in generating the derivative message.

Both the foregoing general description and the following detailed description are exemplary only and do not limit or restrict the present invention in any manner.

BRIEF DESCRIPTION OF THE DRAWINGS

A better understanding of the present invention can be obtained when the following detailed description of a preferred embodiment is considered in conjunction with the following drawings, in which:

FIG. 5 is an illustration of a database arrangement in which entries are not related by record designators.

DETAILED DESCRIPTION

Figure 1:
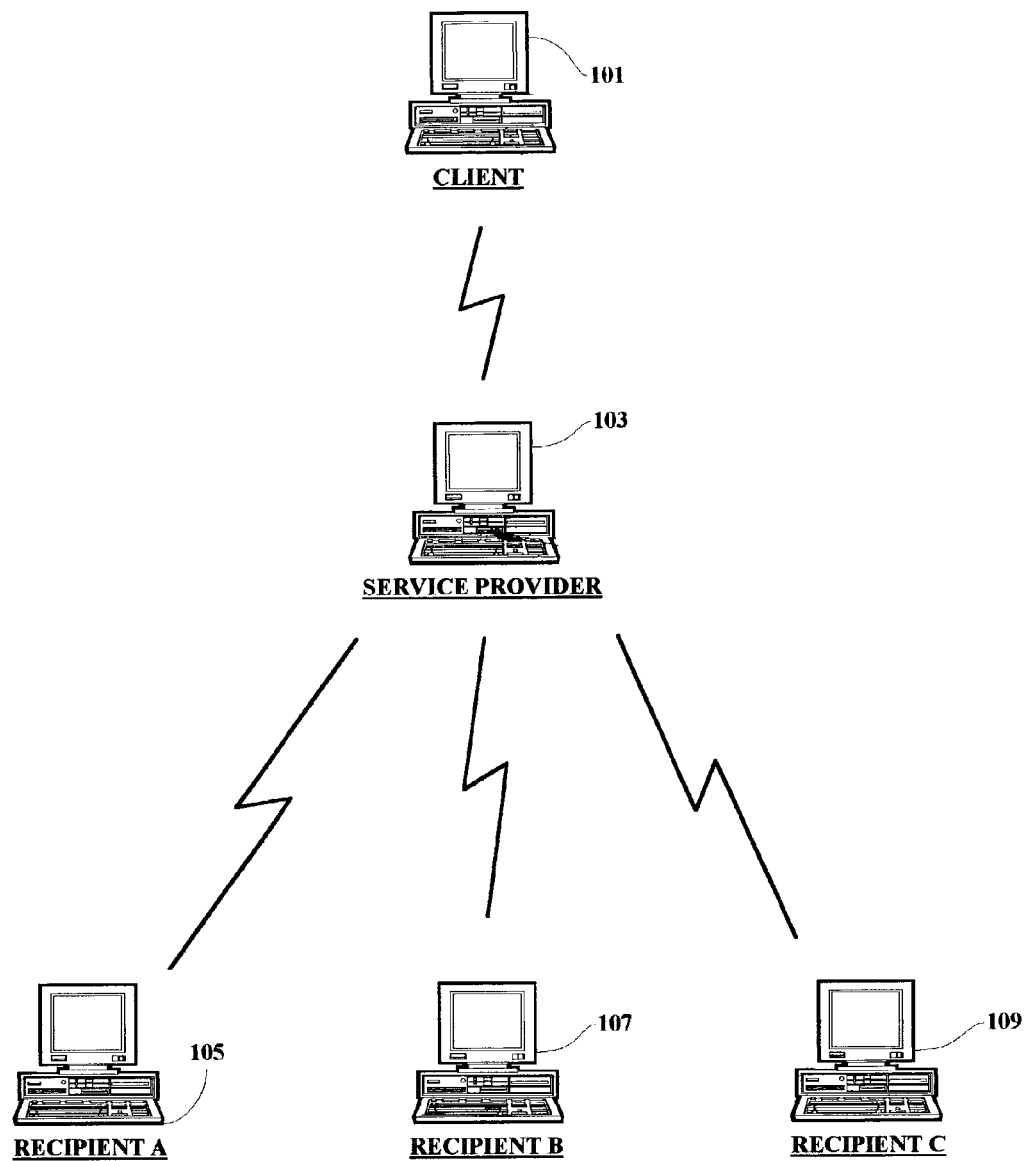
FIG. 1 is a system diagram illustrating an exemplary system in which the present invention may be implemented.

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within a computer network including a computer terminal, which may comprise either a workstation or a PC for example connected within a network. In general, an implementing computer system may include computers configured with a plurality of processors in a multi-bus system in a network of similar systems. As shown in FIG. 1, in an exemplary application, a client computer system 101 is arranged to send original messages to a service provider computer system or server 103. The service provider 103, in turn, is enabled to perform requested services upon the original message and send out one or more resulting or derivative messages to one or more recipients 105, 107 and 109.

Figure 2:
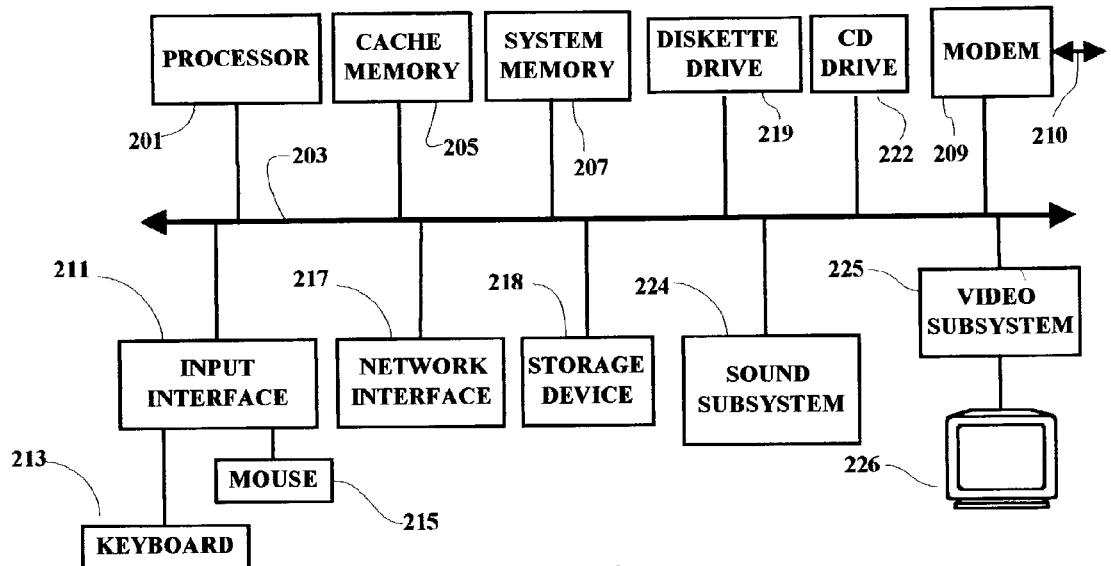
FIG. 2 is a block diagram illustrating several of the components of an exemplary computer system.

Several of the major components of an exemplary computer system 103 implementing the present invention are shown in FIG. 2. A processor circuit 201 is connected to a system bus 203 which may be any host system bus. It is noted that the processing methodology disclosed herein will apply to many different bus and/or network configurations. A cache memory device 205, and a system memory unit 207 are also connected to the bus 203. A modem 209 is arranged for connection 210 to a communication line, such as a telephone line, through a connector 111 (FIG. 1). The modem 209, in the present example, selectively enables the computer system 103 to establish a communication link with other computer systems. The system bus 203 is also connected through an input interface circuit 211 to a keyboard 213 and a mouse or pointing device 215. The bus 203 may also be coupled through a hard-wired network interface subsystem 217. A diskette drive unit 219 and CD drive 222 are also shown as being coupled to the bus 203. A video subsystem 225, which may include a graphics subsystem, is connected to a display device 226. A storage device 218, which may comprise a hard disk drive or CD unit, is also coupled to the bus 203.

The invention in general provides the ability to relate entries in a database through derivative primary key values. The invention may be implemented in connection with a messaging hub in which original messages are received and processed and derivative messages are then sent out to other terminals. In that case a message is received into the hub, dispatched through a sequence of processing steps and delivered to an endpoint. It is required to log the original message content, and all derivative content generated by the various services that process the message. The scheme which is employed in the present example is to first generate a unique primary key for the initial message, and store the record for the original message at the primary key. As the message is propagated to the services, the primary key is passed to the service. This permits the services to access the message to the primary key and generate a derivative primary key for any derivative message which the services produce. In the exemplary embodiment described herein, the service provider offers a splitter service that can break an incoming message (that is actually a package of messages) into the various independent messages, and a translation service that can translate messages from one document format to another. When a bundled message is received, it is logged in a database as a record with an initially generated unique identifier (UUID) as the primary key. In the example, a policy for the generation of derivative primary keys is implemented by appending a string of "." +"service name" +"n" designators where "." is a character chosen to use to separate the primary key fields into its derivative parts, "service name" is the name of the service which produced the new derivative message, and "n" is a count to uniquely identify each of possibly several derivatives produced by the call on the service.

In one example, an incoming message contains 3 sub-messages and each of the sub-messages needs to be translated before delivery. The exemplary methodology will produce the following message log entries:

Primary Key Value Message record UUID: This is used as primary key for storing the initial message record.

UUID.splitter1: This is used as primary key for storing the first of the 3 messages derived by the splitter in the example.

UUID.splitter2: This is used as primary key for storing the 2nd of the 3 messages derived by the splitter in the example.

UUID.splitter3: This is used as primary key for storing the 3rd of the 3 messaged derived by the splitter.

UUID.splitter1.trans1: This is used as primary key to store the translation of the first derived message in the example.

UUID.splitter2.trans1: This is used as primary key to store the translation of the 2nd derived message.

UUID.splitter3.trans1: This is used as primary key to store the translation of the 3rd derived message.

The value of this methodology is that it relates all of the derived messages to the initial messages so that when someone wants to trace what happened to message they sent—the information can be readily recalled. Or if someone wants to know the origins of a message they received that can easily be recalled from the database. Selecting all entries from the Database with primary key starting with UUID, reveals the source of the message and the history of the generation of any derivatives. Although the present example illustrates the use of the present invention in solving message tracking needs, it is understood that the present invention has many uses from general event logging applications to distinguishing sequential activity processing threads by derivative primary keys.

Without this invention, another mechanism would have to be used for relating the messages. The typical solution would be to have a unique primary key for each log entry and for each log entry to contain a field that held the previous primary key. Multiple searches on the database would have to be performed to create the history of the message process. In the given example, to determine how the message with primary key UUID was processed, a data base search would be performed retrieving all the records that referenced UUID as their initial message. That search would retrieve splitter1, splitter2, and splitter 3. The data base would have to be searched three more times to retrieve the entries that referenced each of those messages as input. With the present invention, the entire processing history can be retrieved with a single search.

Figure 3:
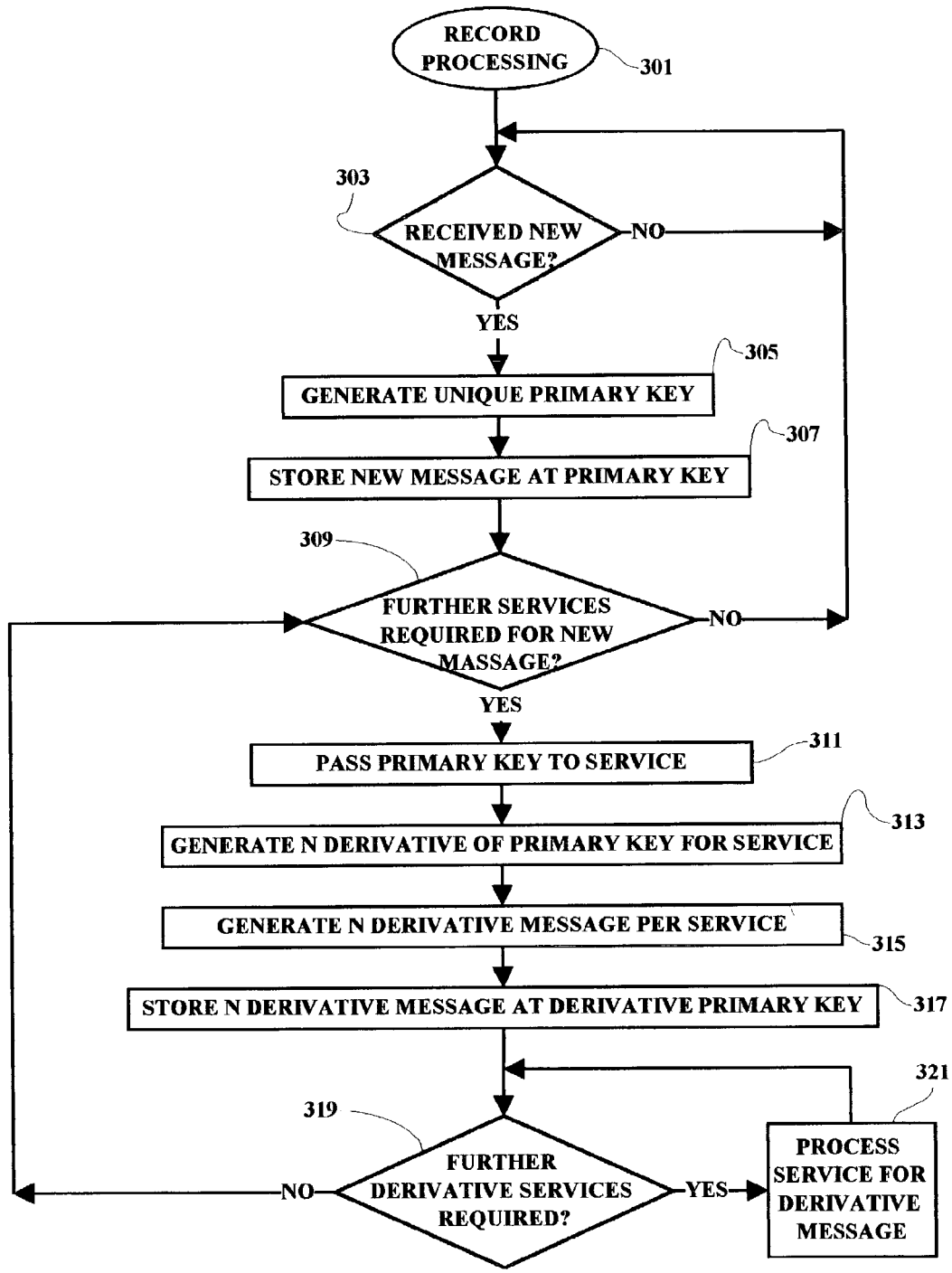
FIG. 3 is a flow chart illustrating an exemplary processing methodology in one implementation of the present invention.

In general, the methodology of the derivative record relating process are illustrated in the flow chart of FIG. 3. As the processing is initiated 301, a determination is made that a new message has been received 303 and a unique primary key is generated 305 and associated with the original message. The new message is stored at the primary key 307 and it is determined if further services are required 309 for the new message. If not, the processing returns to await the next new message 303. If further services are required however 309, then the primary key is passed to the designated service 311 and an "N" derivative of the primary key is generated is generated 313 for the service to be performed. Next, the service is performed and the "N" derivative message is generated 315 for the performed service. The "N" derivative message is then stored at the "N" derivative primary key 317 and a determination is made as to whether further derivative services are required 319 for the first derivative message. If so, further processing is conducted 321 until no more services are required for the current line of derivative messages 319 at which time a determination is then made as to whether there are further services required for the current original message 309. If so, the processing is repeated as illustrated until no more services are required 309 for the new message being processed, and the methodology returns to await the next new message 303.

Figure 4:
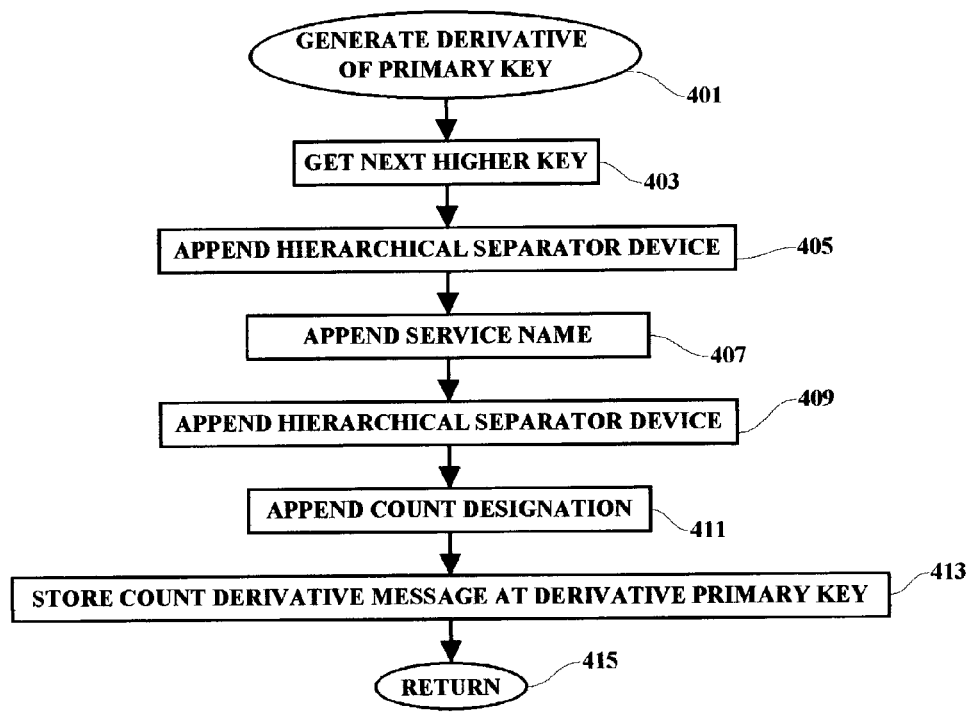
FIG. 4 is a flow chart illustrating one of the steps in FIG. 3 in greater detail.

As shown in FIG. 4, an example of the generation of the derivative designation from the primary key 401 begins by getting the next higher key 403 in the hierarchy of record designations. After appending a hierarchical separator device 405, the next service name is appended 407. Again a hierarchical separator device is appended 409 followed by appending a count designation 411. The count derivative message is then stored at the derivative primary key 413 and the processing returns 415 and continues as shown in FIG. 3. Although in the present example, the separator device used is a "dot" ("."") designation, it is understood that any designator may be used as a separator including, but not limited to, a "slash" ("/"), a "double slash" ("//"), etc.

FIG. 5 illustrates an existing database organization for storing processed messages. The fields for original message IDs are numbered 123-139 in a message ID column 501. The database also includes a reference message ID column 503, a service column 505 and a message data column 507. Column 503 indicates the prior message, column 505 indicates the services performed and column 507 indicates what the message contains after the corresponding service has been performed. As shown in FIG. 5, the MsgID field is the primary key. As illustrated, in order to retrieve the process history of message #138 from the table of FIG. 5, it is determined that the last service provided was "lower" (i.e. change to lower case letters) then get the reference message #136 to look up the message of the previous processing step to find the service that produced it, i.e. "AddB", then get the reference message ID (RefMsgID) value 131 to find out what service was-performed, etc.

Figure 6:
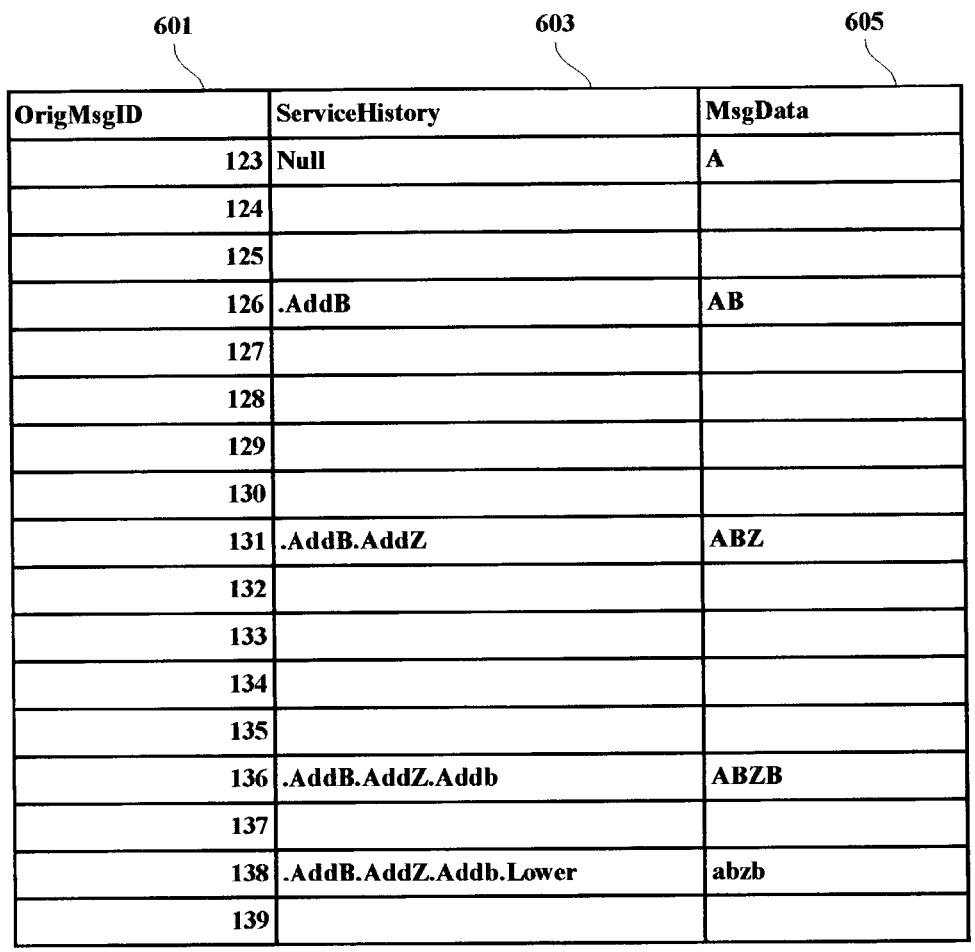
FIG. 6 is an illustration of an exemplary database in which derivative messages are related to an original message through the use of a primary key and derivative key record designators in accordance with the present invention.

With the new methodology as illustrated in FIG. 6, the primary key is OrigMsgID,ServiceHistory. Thus, the entire history of the message processing is available in the single "OriginalMsgID,ServiceHistory" primary key. As shown in FIG. 6, an OrigMsgID column 601 includes reference numbers 123-139 for original messages. A second column 603 shows the ServiceHistory for the corresponding message and a third column 605 shows the message data (MsgData) after the services have been performed. Using the record relating methodology and database structure of the present invention, the processing history of a given message can be determined totally by referring to only the record designator of the given message. For example, as shown in FIG. 6, message #138 appears as "abzb" and the four services performed, i.e. "AddB", "AddZ", "Addb", and "Lower") on original message "A" can be ascertained by merely referring to the ServiceHistory record designator ".AddB.AddZ.Addb.Lower".

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing derivative files within a computer system, said derivative files being derived from original files, said method comprising:
   obtaining an original file;
   creating a primary key designator;
   associating said primary key designator with said original file;
   determining a first service to be performed on said original file;
   performing said first service to said original file, said first service being a processing service performed upon said original file to produce a first derivative file, said first service being determined by a user before said original file is obtained;
   creating a first derivative key designator, said first derivative key designator being descriptive of said first service, said first derivative key designator including said primary key designator;
   associating said first derivative key designator with said first derivative file; and
   storing said first derivative file using said first derivative key designator as a file name for said first derivative file whereby a history of services performed on said original file is included in said key designator of said first derivative file.

2. The method as set forth in claim 1 wherein said original file is an electronic communication.

3. The method as set forth in claim 2 wherein said electronic communication is an original email sent from a sender to a service provider, said first derivative file comprising a first derivative email derived from said original email, said first derivative email being sent from said service provider to a receiving party.

4. The method as set forth in claim 3 and further including generating a plurality of derivative emails from said original email.

5. The method as set forth in claim 4 wherein each of said plurality of derivative emails is sent to a different receiving party.

6. The method as set forth in claim 1 wherein a plurality of services are performed on said original file to produce a corresponding plurality of derivative files, said method further including creating a corresponding plurality of derivative designators associated with respective ones of said derivative files.

7. The method as set forth in claim 6 wherein said derivative key designators are descriptive of said services performed whereby services performed on any one derivative file are ascertainable by inspection of a derivative key file associated with said one derivative file.

* * * * *